United States Patent Office 2,750,340
Patented June 12, 1956

2,750,340
COMBINATION ADDITIVE FOR PETROLEUM PRODUCTS

Philip B. Gerhardt, Elizabeth, John O. Smith, Jr., North Plainfield, and Allen R. Jones, Fanwood, N. J., assignors to Esso Research and Engineering Company, a corporation of Delaware No Drawing. Application August 31, 1953,
Serial No. 377,696

6 Claims. (Cl. 252—33.3)

This invention relates to additives for use in stabilizing organic materials which are susceptible to oxidation and/or polymerization on contact with air or oxygen, and particularly for use in mineral oils and other petroleum hydrocarbon products.

This application is a continuation-in-part of application Serial No. 98,158, filed on June 9, 1949, now abandoned.

It is well known in the art to utilize various addition agents in organic compositions in order to prevent the oxidation of the latter, which results in the production of undesirable degradation products such as peroxides, acidic materials, sludge, varnish-like deposits, and the like. This is particularly the case with respect to hydrocarbon products, both saturated and unsaturated, which are utilized as diesel fuels, motor fuels, and lubricants, including instrument oils, turbine oils, motor oils, greases, emulsifiable oils, and the like. These products are often subject to severe operating conditions of temperature and pressure which tend to aggravate the oxidation reaction.

Furthermore, oxidation of the product either during storage or use, causes undesirable results with respect to the metal surfaces, such as the parts of an internal combustion engine in which the products are used. Corrosion and pitting of the metal surfaces occur as well as various other effects which hinder the efficient operation of the engine. A new combination of oxidation inhibitors has been discovered which efficiently reduce the undesirable effects of the oxidation reaction and which are particularly effective in reducing corrosion of metal surfaces and in inhibiting the tendency of oil to produce an insoluble sludge. These inhibitors are also effective in other types of petroleum oil products such as fuel oils in which they reduce the tendency of the oil to darken and to produce sludge. They are also useful in inhibiting various other organic compositions such as fats, waxes, vegetable oils, fish oils, resins, etc.

In accordance with the present invention, it has been found that the reaction products of aza aromatic compounds and aryl sulfonyl halides or certain derivatives thereof employed as a primary inhibitor in combination with an aromatic compound containing a hydroxy and/or amine substituent as a secondary inhibitor form a combination additive having unexpectedly potent properties. Although the primary and secondary inhibitors are generally good antioxidants in themselves, the combined additives have antioxidant and corrosion preventing effects that are much greater than would be expected from the known properties of the two additives when used separately.

The primary inhibitors of the present invention have substantially the following general formula:

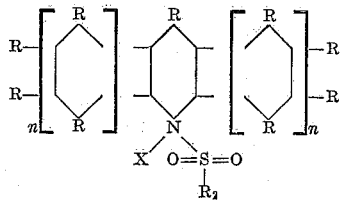

wherein the R radicals are selected from the class consisting of hydrogen, hydrocarbon groups having in the range of 1 to 20 carbon atoms, and hydroxyl groups, $n$ is 0 to 1, X is selected from the class consisting of halogen, —$OR_1$, and $SR_1$ groups, $R_1$ is a hydrocarbon group having in the range of 1 to 20 carbon atoms, and $R_2$ is selected from the class consisting of aryl and alkaryl groups having in the range of 6 to about 30 carbon atoms.

The nitrogen-containing compounds which are employed in preparing the primary antioxidants of the present invention may be more exactly defined as aza aromatic compounds of the formulas:

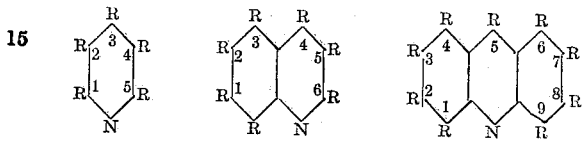

where the R groups represent hydrogen and hydrocarbon groups containing 1 to 20 carbon atoms. The hydrocarbon groups may, for example, be alkyl, alkenyl, cycloalkyl, aryl, or terpenic groups, or combinations of such groups. It is preferable, although not necessary, that the groups adjacent to the nitrogen atom in the ring, when such groups are alkyl groups, have at least one hydrogen atom attached to the carbon atom which is adjacent to the nucleus. Examples of these compounds are pyridine, picolines, lutidines, ethylpyridines, collidine and other methylethylpyridines, conyrine, parvoline, 2-benzylpyridine, 3-phenylpyridine, quinoline, quinaldine, lepidine, dimethylquinolines, ethylquinolines, 2-phenylquinoline, tetracoline, acridine, 5-methylacridine, 5-phenylacridine, the pyridols, 2,-4-pyridinediol and other dihydroxy pyridines, 2,4,6-pyridinetriol, the quinolinols, dihydroxy quinolines, various mono and polyhydroxy acridines and the like.

The aryl sulfonyl halides generally react with the pyridine or similar compounds at room temperature and without the use of a catalyst, but temperatures in the range of about 0° to 100° F. may be employed. The reaction generally involves equimolar quantities of reactants. The use of equimolar quantities is preferred; however, other ratios may be used and unreacted material may be removed or left in the product as a diluent.

The aryl sulfonyl halides employed in forming the reaction product with the above nitrogen containing compounds have the general formula:

where $R_2$ is an aryl or alkaryl group having from 6 to 30 carbon atoms, such as benzene, naphthalene, anthracene and their alkyl derivatives, and X is a halogen such as chlorine, bromine and the like, the chloride derivatives being preferred. Alkaryl groupings may have alkyl groupings having relatively few carbon atoms if the final product is used as an additive for motor fuels and the like whereas side chains having from 8 to 20 carbon atoms may be used to increase oil solubility of the final product for use in lubricants and the like. Specific compounds include benzene sulfonyl chloride, p-toluene sulfonyl chloride, 2-n-hexadecyl benzene sulfonyl chloride, naphthalene sulfonyl chloride, 4-isooctyl benzene sulfonyl chloride, halides of petroleum sulfonic acids, etc.

The structure of the addition product formed by the reaction of the aryl sulfonyl halide with a nitrogen base of the type described has substantially the composition illustrated by the formula:

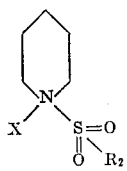

where X and R₂ have the meanings defined in connection with the above formula, R₂SOOX.

Specific desirable compounds for instance are: benzene sulfonyl pyridinium chloride, benzene sulfonyl quinolinium chloride, benzene sulfonyl-2,6-lutidinium chloride, benzene sulfonyl quinaldinium chloride, benzene sulfonyl quinaldinium bromide, benzene sulfonyl lepidinium chloride, benzene sulfonyl-2-n-butyl pyridinium chloride, benzene sulfonyl-4-n-amyl pyridinium chloride, p-toluene sulfonyl-2,6-lutidinium chloride, 2-ethyl benzene sulfonyl-2-methyl pyridinium chloride, 2-ethyl benzene sulfonyl-4-methyl pyridinium chloride, p-toluene sulfonyl-quinaldinium chloride, naphthalene sulfonyl-2,6-lutidinium chloride, benzene sulfonyl-2 (5-nonyl) pyridinium chloride, benzene sulfonyl-2-lauryl-pyridinium chloride, benzene sulfonyl-4-octadecyl-pyridinium chloride, p-toluene sulfonyl 2-cetylpyridinium chloride, o-ethyl benzene sulfonyl-4-decyl pyridinium chloride, p-isopropyl benzene sulfonyl-2-hexadecyl quinolinium chloride, 4-(8-octadecyl) benzene sulfonyl-pyridinium chloride, 4-n-tetradecyl benzene sulfonyl-2,6-lutidinium chloride, 2-n-hexadecyl benzene sulfonyl-2-ethyl pyridinium chloride, naphthalene sulfonyl-4-hexadecylpyridinium chloride, 4-n-lauryl benzene sulfonyl-4-hexadecylpyridinium chloride, and 4-isooctyl benzene sulfonyl-2-octadecyl pyridinium chloride.

Although the products produced by the method described above are quite effective as the primary antioxidants in various products derived from petroleum, it has been found advantageous to modify the product by replacing the halogen atom, introduced by means of the aryl sulfonyl halide, with a group containing a hydrocarbon radical, such as a group —TR, where T represents oxygen or sulfur and R₁ is a hydrocarbon group, which may be an alkyl, alkaryl or aralkyl group containing 1 to 20 carbon atoms. This is accomplished by treating the reaction product prepared according to the method described above with an alkali metal alcoholate, mercaptide, phenolate, or thiophenolate. This reaction is also generally carried out at room temperature, although the temperature may range from about 20° to about 100° C. or higher. The amount of the metal alcoholate, mercaptide or the like which is employed is normally that which is theoretically equivalent to, or slightly in excess of, the halogen introduced into the first reaction product by means of the acid halide. It is possible to consider this product as having the constitution represented by the formula:

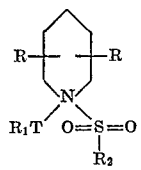

where R, R₁, and R₂ and T have the meanings defined above.

The compounds of the type R₁TM which may be employed in the modifying reaction are exemplified by the following: sodium methylate, sodium ethylate, potassium ethylate, sodium n-propylate, sodium isopropylate, sodium n-butylate, sodium tert.-butylate, sodium n-octylate, sodium cyclohexylate, sodium laurylate, sodium hexadecylate, sodium eicosylate, sodium ethyl mercaptide, sodium lauryl mercaptide, sodium phenylate, potassium phenylate, sodium naphthylate, the sodium salt of 1-hydroxy-4-phenylbutane, the sodium salt of 1-hydroxy-3-phenylhexane, sodium thiophenylate, and the like. The metallic compounds may be derived from commercial mixtures of alcohols as well as from pure alcohols. An example of a suitable mixture is "Lorol B" alcohol, a mixture of C₁₀ to C₁₈ primary alcohols derived from coconut oil.

The compounds used in conjunction with the above-mentioned compounds as secondary inhibitors include the hydroxy aromatic ring compounds in which the hydroxyl group is directly attached to a carbocyclic aromatic ring and heterocyclic compounds, in which the hydroxyl group is attached to a ring containing a sulfur, oxygen or other atom. Suitable secondary inhibitors also include aromatic substituted amines, phenol substituted amines, and the like.

The phenols include monohydroxy and polyhydroxy compounds such as catechol and those in which more than one ring is present such as naphthols and the like. In addition to the hydroxyl group or groups, the ring is preferably substituted with one or more other substituents such as hydrocarbon groups including alkyl groups, cyclo-aliphatic groups and the like, and such substituents include alkyl groups connecting or linking two phenolic radicals together to form bis phenols. Other effective substituents for the phenolic ring include alkoxy groups, acyl groups, sulfur atoms, particularly in cases where one or more sulfur atoms link two phenolic radicals together to form phenol sulfides, and the like.

The lower molecular weight alkyl phenols include the cresols, xylenols, thymol, carvacrol, orcinol, pyrogallol, phloroglucinol, butyl phenols, and decyl phenols. The phenols having long-chain alkyl substituent groups are quite useful from the standpoint of effectiveness and solubility. These include "wax phenols" having alkyl groups with above about twenty carbon atoms and prepared by condensing a phenol with a chlorinated paraffin wax, although "petroleum phenols" recovered from middle distillate petroleum oils and the like are suitable.

Phenols having at least one tertiary aliphatic group are generally preferred. These include tert.-butyl phenol, tert.-amyl phenol, tert.-octyl phenol, di-tert.-butyl resorcinol, etc. Particularly preferred are the tri-alkylated phenols, especially mono hydroxy phenols, such as 2, isopropyl-4,6 di-methyl-phenol; 2-tert.-amyl-4,6-di-methyl-phenol; 4-methyl-2,6 di-tert.-amyl phenol; 2,6-di-tert.-butyl-4-methyl-phenol; 2,4,6-tri-isopropyl phenol, and the like. Other hydrocarbon substituent groups may also be present. For example, 2,6-di-tert.-amyl-4-cyclo-hexyl-phenol may be used.

Bis phenols are also effective. These include bis (2-hydroxy-3-tert.-butyl-5-methylphenyl) methane; 2,2-bis (2-hydroxy-3-tert.-butyl - 5 - methylphenyl) - propane; bis (2-hydroxy-3-tert.-butyl-5-methylphenyl) - di - 4 - methyl-phenyl-methane; bis (2 - hydroxy - 5 - tert. - butylphenyl)-furylmethane; 1,1-bis (2-hydroxy-3-tert.-butyl-5-methylphenyl) isobutane; and the like.

Various aromatic amines and aminophenols include substituted amino phenols and amino naphthols such as di-ethyl amino phenols, benzyl amino phenol, N-n-butyl para-amino phenol; N-methyl-N-heptyl-aminophenols; phenyl alpha naphthyl amine, and the like.

Acyl derivatives of mono- and polyhydroxy phenols are useful. These include acetyl, propionyl, valeryl, palmityl, stearyl, benzoyl and the like derivatives of phenol, pyrogallols, etc. N-acyl p-amino phenols are also useful. Specific compounds include N-propionyl-p-aminophenol; N-lauroyl-3-pentadecyl-4-aminophenol; N-butyryl-2,6-di-tert.-octyl-4-amino-phenol, and the like. Alkoxy phenols such as 2-tert.-butyl-4-methoxyphenol are suitable.

Suitable alkyl phenol sulfides include tert.-amyl phenol sulfide, tert.-octyl phenol sulfide, di-tert.-octyl phenol sulfide, and other substituted phenol sulfides.

It should be recognized that the above constitutes only a partial list of known hydroxy aromatic and aromatic amine compounds that have inhibiting properties and that may be used in the practice of this invention. It is generally preferred to use phenolic compounds. Those having known potent antioxidant properties are usually preferred, but those that are less effective per se as additives may be used in conjunction with the primary additive to obtain the synergistic improvement the effectiveness of the combined additive. The secondary inhibitor should be soluble in the mineral oil composition and it is desirable to use higher molecular weight members that have low solubility in water. The term "phenolic compound" will include mixtures of various phenols as well as single members.

The quantity of the combined additives of the present invention which may be most advantageously blended in the material to be inhibited will depend upon the material to which they are added and upon the conditions to which the material is to be subjected in use or in storage. Generally a total amount of the mixture in the range of about 0.01 to 5% or even higher, based on the total composition, will generally be sufficient to inhibit oxidation and to suppress corrosion and the like. Preferred amounts of the combined inhibitor are in the range of about 0.05 to 2% by weight, based on the total composition, particularly where the material being inhibited is a mineral oil and the like. The ratio of the primary to the secondary inhibitor may vary considerably, but it is generally preferred that the ratio be in the range of about 0.1 to 5 parts by weight of primary inhibitor per part by weight of secondary inhibitor, with substantially equal portions being suitable. It will be obvious that the relative amounts of the primary and secondary inhibitors will depend upon the relative potency of the relative materials and upon the characteristics of the material being inhibited.

In the following examples, various preparations and tests of additives prepared in accordance with the present invention will be described in detail, but it is to be understood that these examples are illustrative only and should not be considered as limiting the scope of the invention in any way.

EXAMPLE 1

A sample of a solvent extracted turbine oil base having a Saybolt viscosity of 44 second at 210° F. and containing 0.06 percent by weight of a zinc naphthenate corrosion inhibitor was tested for oxidation stability.

The test employed was a modification of the Staeger test and consists essentially of storing a 200 ml. sample of oil in a rotating shelf oven maintained at 110° C.±1°. A 40 x 70 mm. freshly polished copper strip is placed in the 400 ml. oil container to serve as an oxidation catalyst. This strip is removed every 72 hours and a clean strip is substituted. During the test, the shelf rotates at an angular velocity of 4–6 R. P. M. and positive ventilation of 1.5 to 2.0 cubic feet of air per hour is maintained. Oil samples are periodically withdrawn from the container and the neutralization number is determined. The oxidation life of the sample is defined as the time in hours required to obtain an increase in neutralization number of 0.20 mg. KOH/g.

Under these test conditions, the oil was found to have an oxidation life of 65 hours.

EXAMPLE 2

To the oil described in Example 1, 0.2 wt. percent of 2,6-di-t-butyl-4-methylphenol was added. The oxidation life in the modified Staeger test described in Example 1 was 210 hours.

EXAMPLE 3

After adding 0.4 weight percent of 2,6-di-t-butyl-4-methylphenol to the oil described in Example 1, the oxidation life was increased to 475 hours.

EXAMPLE 4

Benzene sulfonyl quinolinium chloride was prepared by adding 17.7 grams of benzene sulfonyl chloride to 12.9 grams of quinoline. The product was crystallized from acetone, and the yield amounted to 24 grams. This material acted as an oxidation inhibitor and had a synergistic effect on the potency of 2,6-di-t-butyl-4-methylphenol as may be noted from Table I.

EXAMPLE 5

Benzene sulfonyl lutidinium chloride was prepared by adding 31.1 grams of benzene sulfonyl chloride to 18.9 grams of lutidine. After cooling, grayish crystals formed. The crystals were recrystallized from acetone. Sample was blended in 0.4 weight percent conc. in turbine oil described in Example 1 and neutralization number increase was 0.13 after 768 hours. This product was also added in 0.2 wt. percent conc. to turbine oil described in Example 2 which contained 0.2 wt. percent 2,6-di-t-butyl-4-methylphenol and Staeger life was 950 hours. In both cases, mentioned above, the exceptionally long life, during which portions of the sample had to be withdrawn for determination of neutralization number, resulted in depletion of the sample before it ever developed an increase of 0.2 neutralization number, which is the arbitrary measure of Staeger life as defined hereinbefore.

EXAMPLE 6

Benzene sulfonyl 8-hydroxy quinolinium chloride was prepared by adding 27.5 grams of benzene sulfonyl chloride to 22.5 grams of 8-hydroxy quinoline. Yellow crystals formed upon cooling. The crystals were recrystallized from a mixture of acetone and ethyl alcohol. The sample was blended in 0.4 wt. per cent concentrate in turbine oil described in Example 1 and Staeger life was 60 hours. This product was also added in 0.2 wt. per cent concentration to turbine oil described in Example 2 which contained 0.2 wt. per cent, 2,6-di-t-butyl-4-methyl phenol and neutralization number increase was 0.05 after 570 hours at which sample became depleted.

TABLE I

*Oxidation stability of turbine oil samples*

| Antioxidant | | | "Staeger" Oxidation Life, Hours [a] |
|---|---|---|---|
| Name | Concentration, wt. percent | Base Oil [b] | Base Oil + 0.2 wt. percent 2,6-di-t-butyl-4-methylphenol [c] |
| None | 0.0 | 65 | 210 |
| 2,6-di-t-butyl-4-methylphenol | 0.4 | 475 | |
| Benzene sulfonyl quinolinium chloride | 0.4 | 115 | |
| Benzene sulfonyl (2,6-) lutidinium chloride | 0.4 | >768 (0.13) | |
| Benzene sulfonyl quinolinium chloride | 0.2 | | 610 |
| Benzene sulfonyl (2,6-) lutidinium chloride | 0.2 | | >950 |
| Benzene sulfonyl 8-hydroxy quinolinium chloride | 0.4 | 60 | |
| Do | 0.2 | | >570 (0.05) |

[a] Numbers in parentheses are increases in neutralization number at indicated time. Samples depleted at this point.
[b] Oil described in Example 1.
[c] Oil described in Example 2.

EXAMPLE 7

A benzene sulfonyl lutidinium alkyl oxide was prepared from benzene sulfonyl lutidinium chloride, described in Example 5. 0.8 gram of sodium was reacted with 15 grams of mixed $C_{10}$–$C_{18}$ "Lorol B" alcohols which had an average chain length of $C_{12.6}$ and which were obtained from hydrogenated coconut oil. The mixture thus obtained was then added to benzene sulfonyl lutidinium chloride in the following proportions: 5.0 grams of benzene sulfonyl lutidinium chloride and 10.9 grams sodium derivative of the mixed alcohols. The reaction was carried out in xylene by refluxing for several hours, and then removing the xylenes by distillation. The product was a brownish red liquid. The sample was blended in 0.4 wt. per cent concentrate in turbine oil, described in Example 1, and the Staeger oxidation life was 739 hours. This product was also added in 0.2 wt. per cent concentrate to turbine oil described in Example 2 which contained 0.2 wt. per cent concentrate 2,6 di-t-butyl-4-methylphenol, and the Staeger life was 432 hours. No sludge was formed in either of the two Staeger tests, but the color of the sample that had a life of 739 hours was equally as good at the 667th hour as that of the other sample after 432 hours.

EXAMPLE 8

Benzene sulfonyl lutidinium octadecyl sulfide was prepared by reacting benzene sulfonyl lutidinium chloride with the sodium salt of octadecylmercaptan as follows. Two grams of benzene sulfonyl chloride were reacted with 1.2 grams of lutidine by heating. Octadecyl mercaptan in the amount of 3.2 grams was reacted with 0.25 gram of sodium. The two reaction products above were combined and heated until reaction was complete using amyl acetate as a solvent. The sodium chloride was filtered off and the product crystallized from amyl acetate. The yield was 2.6 grams. The sample was blended in 0.4 wt. per cent concentration in turbine oil described in Example 1 and the Staeger life determined to be greater than 1268 hours. The sample was blended in 0.2 wt. per cent in the above oil and 0.2 wt. per cent 2,6 di-tert.-butyl-4-methylphenol added the Staeger life was greater than 1337.

Benzene sulfonyl lutidinium octadecyl sulfide is also a bearing corrosion inhibitor as measured by the S. O. D. 4 hour bearing corrosion test which is carried out as follows: 500 cc. oil sample is maintained at 325° F. and aerated with 2 cu. ft. per hour of air. A steel shaft to which is affixed two one-quarter copper-lead bearings with total bearing area of 4.5 sq. in., rotates at 600 R. P. M. with the bearings immersed in the oil. The test is run for four hours and the loss of weight of the bearings determined. The test is continued for another four hours, and the bearing weight loss again determined. The S. O. D. life is the number of hours at which the cumulative weight loss becomes 100 mg. Using an S. A. E. 20 oil, whose S. O. D. life was 9 hours, the S. O. D. life was 22 hours when the oil contained 0.25 wt. per cent of the additive.

The present invention may be more fully understood by a comparison of the oxidation test results which were described in Examples 1 to 6. For purposes of convenience, these results have been summarized in Table I. It may be seen from this table that under these accelerated oxidation conditions, in the case of both the benzene sulfonyl quinolinium chloride and the benzene sulfonyl 8-hydroxyquinolinium chloride, the compounds themselves had only a slight or no inhibitory effect. However, if these compounds are added to an oil containing an antioxidant known to be effective under these test conditions, a pronounced synergistic action is found. For example, by the proportional relationships that would be normally applied, a 50/50 mixture of 2,6-di-t-butyl-4-methyl-phenol and benzene sulfonyl quinolinium chloride would be expected to increase the Staeger oxidation life to a point about halfway between their separate effects. Thus, for this 50/50 mixture at 0.4 wt. per cent concentration, the expected Staeger life would be about 285 hours. However, examination of Table I will show that a value of 610 hours was obtained which is more than a twofold increase over what would be predicted. An even greater synergistic activity was found for benzene sulfonyl 8-hydroxyquinolinium chloride for which an oxidation life of about 270 hours would be predicted when added to the antioxidant containing oil whereas the oil sample increased in neutralization number by only 0.05 unit after 570 hours, at which time the test had to be discontinued due to depletion. The synergistic action of benzene sulfonyl (2,6-) lutidinium chloride was masked by its own potent antioxidant effect since it was impossible to determine the exact Staeger life of this material alone, again due to depletion of the sample after the abnormally long duration of 768 hours, but the combination of this material with the phenol gave even a longer life.

EXAMPLE 9

The effect of various phenolic and aromatic amine compounds in combination with benzene sulfonyl lutidinium chloride (BSLC) as inhibitors was also tested. In this series, a mineral oil base stock of the type described in Example I (containing 0.06 weight per cent zinc naphthenate) containing the primary and/or secondary inhibitor was tested by the above described Staeger test. Results are shown in Table II, below:

TABLE II

| Additive in Oil, Wt. Percent | "Staeger" Oxidation Life, Hours |
|---|---|
| 0.1% phenyl alpha naphthyl amine (PANA) | 376 |
| 0.1% benzene sulfonyl lutidinium chloride (BSLC) | 300 |
| 0.05% PANA and 0.05% BSLC | 583 |
| 0.1% 2-tert-butyl-4-methoxyphenol (TBMP) | 432 |
| 0.05% TBMP and 0.05% BSLC | 600 |
| 0.1% bis (2-hydroxy-3-tert.-butyl-5-methylphenyl) methane | 418 |
| 0.05% above bis phenol and 0.05% BSLC | 580 |

In each case, the combination of the amine or phenol and the benzene sulfonyl lutidinium chloride at a total 0.1 weight percent concentration level in the oil gave an unexpectedly superior Staeger life to any of the ingredients when used alone at an 0.1 weight percent concentration level.

The combination additive of the present invention may be employed not only in ordinary hydrocarbon lubricating oils but also in the "heavy duty" type of lubricating oils which have been compounded with such detergent-type additives as metal soaps, metal petroleum sulfonates, metal phenates, metal alcoholates, metal alkyl phenol sulfides, metal organo phosphates, phosphites, thiophosphates, and thiophosphites, metal xanthates and thioxanthates, metal thiocarbamates, and the like.

The lubricating oil base stock used in the compositions of this invention may be straight mineral lubricating oils or distillates derived from paraffinic, naphthenic, asphaltic or mixed base crudes, or, if desired, various blended oils may be employed as well as residuals, particularly those from which asphaltic constituents have been carefully removed. The oils may be refined by conventional methods using acid, alkali and/or clay or other agents such as aluminum chloride, or they may be extracted oils produced by solvent extraction with solvents such as phenol, sulfur dioxide, etc. Hydrogenated oils or white oils may be employed as well as synthetic oils prepared, for example, by the polymerization of olefins or by the reaction of oxides of carbon with hydrogen or by the hydrogenation of coal or its products. In certain instances cracking coal tar fractions and coal tar or shale oil distillates may also be used. Also, for special applications, animal, vegetable or fish oils or their hydrogenated or voltolized products may be employed in admixtures with mineral oils.

For the best results the base stock chosen should normally be an oil which without the new additive present gives the optimum performance in the service contemplated. However, since one advantage of the additives is that their use also makes feasible the employment of less satisfactory mineral oils, no strict rule can be laid down for the choice of the base stock. The additives are normally sufficiently soluble in the base stock, but in some cases auxiliary solvent agents may be used. The lubricating oils will usually range from about 40 to 150 seconds (Saybolt) viscosity at 210° F. The viscosity index may range from 0 to 100 or even higher.

Other agents than those which have been mentioned may be present in the oil composition, such as dyes, pour point depressants, heat thickened fatty oils, sulfurized fatty oils, sludge dispersers, thickeners, viscosity index improvers, oiliness agents, resins, rubber, olefin polymers, and the like.

Assisting agents which are particularly desirable as plasticizers and defoamers are the higher alcohols having preferably 8–20 carbon atoms, e. g., octyl alcohol, lauryl alcohol, stearyl alcohol, and the like.

In addition to being employed in lubricants, the additives of the present invention may also be used in other mineral oil products such as motor fuels, fuel oils, hydraulic fluids, torque converter fluids, cutting oils, flushing oils, turbine oils, transformer oils, industrial oils, process oils, and the like, and generally as antioxidants in mineral oil products. They may also be used in gear lubricants, greases and other products containing mineral oils as ingredients.

What is claimed is:

1. A liquid hydrocarbon material susceptible to oxidation containing a corrosion-inhibiting amount of zinc naphthenate and an oxidation-inhibiting amount in the range of about 0.01 to 5% by weight, based on the total composition, of a mixture of benzene sulfonyl lutidinium chloride and a secondary oxidation inhibitor selected from the group consisting of 2,6-di-tert.-butyl-4-methylphenol, phenyl alpha naphthylamine, 2-tert.-butyl-4-methoxyphenol, and bis (2-hydroxy-3-tert.-butyl-5-methylphenyl) methane, the ratio of said benzene sulfonyl lutidinium chloride to said secondary oxidation inhibitor being in the range of about 0.1 to 5 on a weight basis.

2. A composition according to claim 1 wherein said liquid hydrocarbon material is a mineral oil.

3. A composition according to claim 1 wherein said secondary oxidation inhibitor is phenyl alpha naphthylamine.

4. A composition according to claim 1 wherein said secondary oxidation inhibitor is 2-tert.butyl-4-methoxyphenol.

5. A composition according to claim 1 wherein said secondary oxidation inhibitor is bis (2-hydroxy-3-tert.-butyl-5-methylphenyl) methane.

6. A liquid hydrocarbon material susceptible to oxidation containing an oxidation-inhibiting amount in the range of about 0.01 to 5% by weight, based on the total composition, of a mixture of benzene sulfonyl lutidinium chloride and 2,6-di-tert.-butyl-4-methylphenol, and a corrosion-inhibiting amount of zinc naphthenate.

References Cited in the file of this patent

UNITED STATES PATENTS

| | | |
|---|---|---|
| 2,270,577 | Bergstrom | Jan. 20, 1942 |
| 2,412,634 | Schwartz | Dec. 17, 1946 |
| 2,467,118 | Duncan et al. | Apr. 12, 1949 |
| 2,537,428 | Seon | Jan. 9, 1951 |
| 2,582,733 | Zimmer et al. | Jan. 15, 1952 |
| 2,676,926 | Smith | Apr. 27, 1954 |
| 2,694,045 | Jones | Nov. 9, 1954 |